No. 829,194. PATENTED AUG. 21, 1906.
E. A. CARMICHAEL.
WEIGHING APPARATUS.
APPLICATION FILED AUG. 9, 1905.
3 SHEETS—SHEET 3.
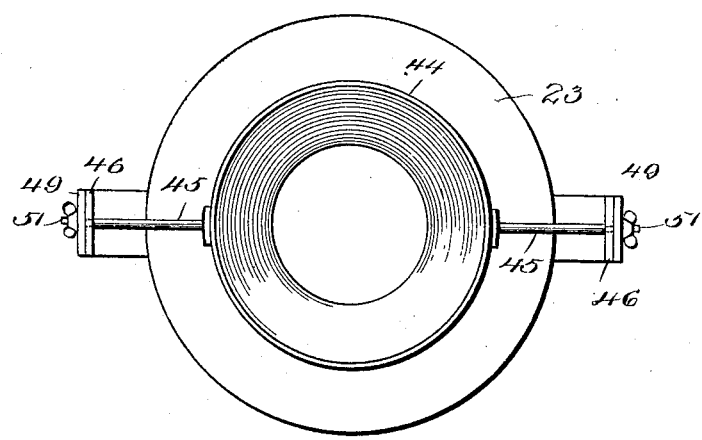
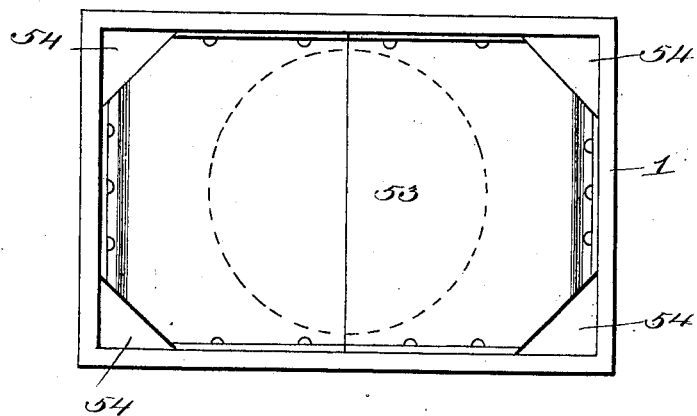

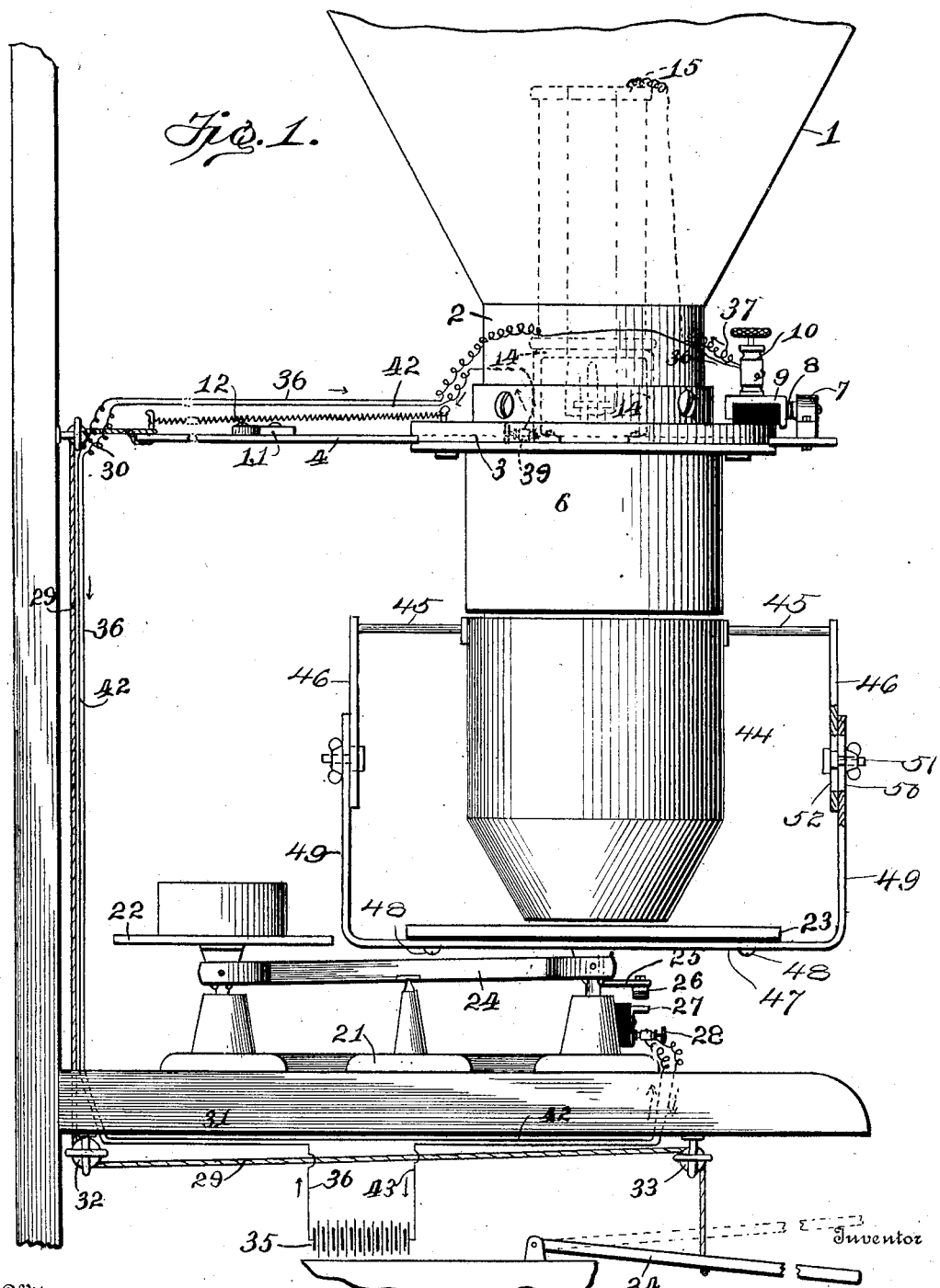

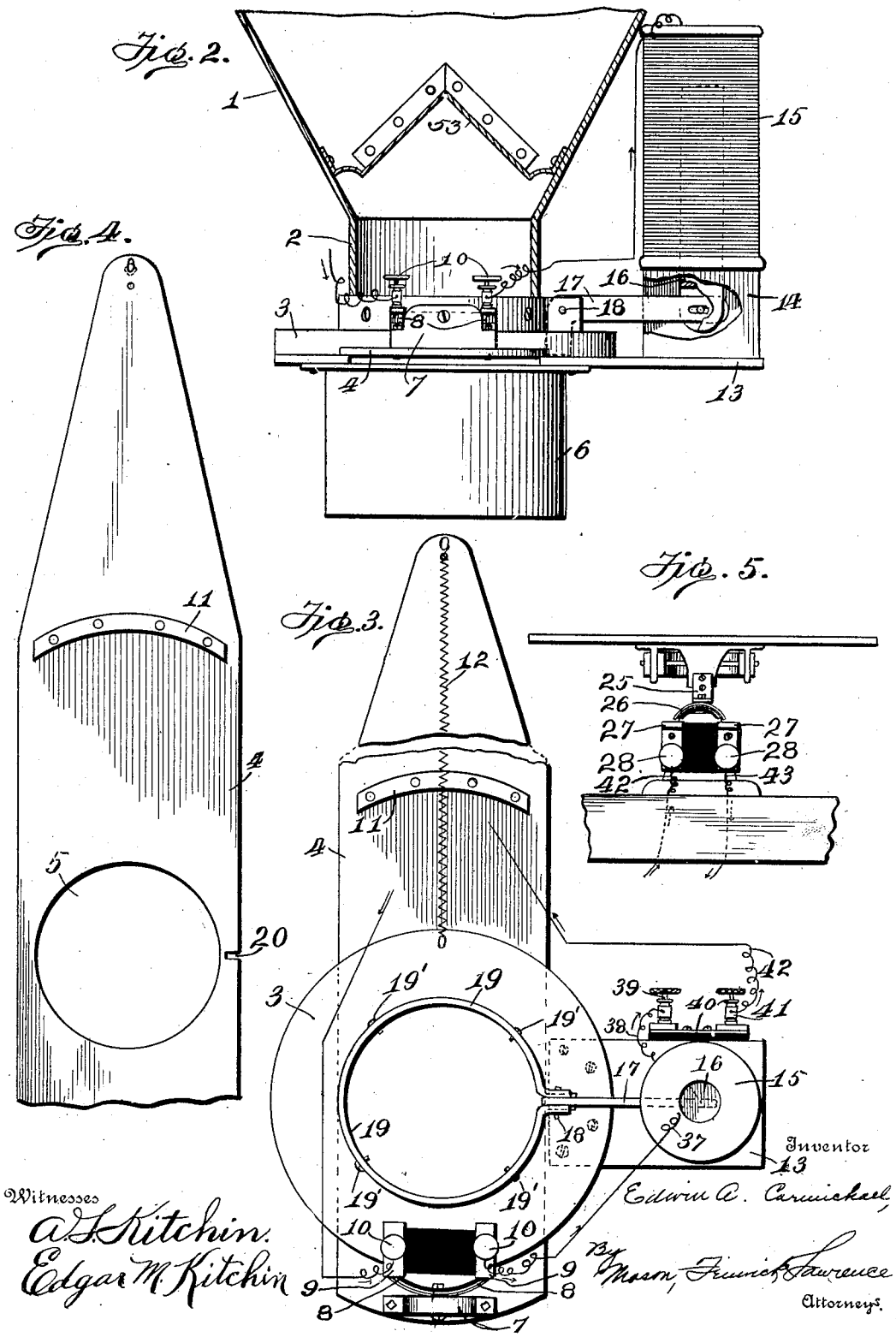

UNITED STATES PATENT OFFICE.

EDWIN A. CARMICHAEL, OF OMAHA, NEBRASKA.

WEIGHING APPARATUS.

No. 829,194.  Specification of Letters Patent.  Patented Aug. 21, 1906.

Application filed August 9, 1905. Serial No. 273,427.

*To all whom it may concern:*

Be it known that I, EDWIN A. CARMICHAEL, a citizen of the United States, residing at Omaha, in the county of Douglas and State of Nebraska, have invented certain new and useful Improvements in Weighing Apparatus; and I do hereby declare the following to be a full, clear, and exact description of the invention, such as will enable others skilled in the art to which it appertains to make and use the same.

This invention relates to improvements in weighing apparatus, and more particularly to electrical devices for automatically controlling weighing operations.

The object in view is the insuring of the closing of the valve controlling the discharging of the material from the container after the discharge of the predetermined quantity thereof. This and other objects are attained by the employment, in combination with a balance-scale and a container arranged above the same, of an automatically-governed valve controlling the discharge from said container onto said scale, an electrical switch connected with said valve, and an electrical switch connected with said scale, such switches being designed to be alternately opened for maintaining the circuit of the valve-governing device normally broken.

The invention comprises certain novel constructions, combinations, and arrangement of parts as will be hereinafter fully described and claimed.

In the accompanying drawings, Figure 1 represents a view in side elevation of a weighing apparatus embodying the features of the present invention. Fig. 2 represents a vertical sectional view of a fragment of the container, the surrounding parts being illustrated in front elevation and parts being broken away for disclosing the interior structure. Fig. 3 represents a top plan view of parts seen in Fig. 2 with the hopper omitted. Fig. 4 represents a detail top plan view of the slide-valve. Fig. 5 represents a view in front elevation of the scale, showing the switch connected therewith. Fig. 6 represents a top plan view of the receiving-casing scoop and surrounding parts detached. Fig. 7 represents a top plan view of the hopper detached.

Referring to the drawing by numerals, 1 indicates any suitable hopper or other container formed with a discharge-spout 2, provided with a slide-valve casing 3, in which is slidingly mounted any ordinary slide-valve 4, said slide-valve 4 being formed with an aperture 5, adapted at times to be brought into register with a discharge-spout 2. Extending below and fixed to the casing 3 is a guiding-sleeve 6, designed to direct material discharging through the spout 2 and the aperture 5 into any receptacle arranged beneath said sleeve. The slide 4 is provided at one end with a bracket 7, carrying a spring-contact 8, adapted to have its ends at times contact with contact-blocks 9 9, said blocks 9 being connected with binding-posts 10 10, carried by the casing 3, said binding-posts and blocks being of course suitably insulated from said casing. The bracket 7 is also preferably insulated from the slide for insuring against short-circuiting. The end of the slide opposite that carrying bracket 7 is provided with a segmental stop-plate 11, curved to conform to the contour of the periphery of the casing 3, said casing being preferably disk-shaped, said plate 11 being designed to limit the longitudinal movement of the slide toward the casing. A coil-spring or other elastic connection 12 is attached at one end to the casing 3 and at the other end to the extreme end of the slide 4 in position for drawing said slide in a direction for causing the plate 11 to rest normally in contact with the casing 3. A bracket 13 extends laterally from the casing 3 and carries at its outer end any suitable stand 14, supporting a solenoid-coil 15, within which coil is arranged a vertically-movable core 16, said core being connected by pin-and-slot connection to an angle-lever 17. The lever 17 is pivoted at its angle, as at 18, between the ends of a ring 19, projecting upwardly from and carried by the slide-casing 3, said ring surrounding spout 2 and being connected therewith by means of suitable rivets or other attaching means 19'. Normally the weight of the core 16, acting upon the long arm of the lever 17, causes the short arm, which latter projects downwardly from pivot 18, to rest with its outer edge in contact with the contiguous edge of the slide 4, and as said slide is provided with a notch 20 in its edge said short arm is designed to move into said notch when the notch is brought opposite the arm, whereby the slide 4 may be locked against inward longitudinal movement. As illustrated, the lever 17 is arranged opposite the center of the discharge-spout 2, and therefore the notch 20 is arranged opposite the center of the opening 5, so that when said notch is engaged by said lever the slide 4 will be retained with the opening 5 in register with the discharge-spout 2. It is of course obvious that if the lever 18 were disposed at one side of the discharge-spout 2 and the position of the notch 20 correspondingly altered the result would be the same.

Beneath the hopper 1 and the parts carried thereby is arranged an ordinary balance-scale 21, provided with the usual weight-receiving plate 22 and an article-receiving plate 23, said plates being carried by the opposite ends of the balance-lever 24. A bracket 25 is fixed to a depending portion of the plate 23 and a spring-contact 26 is carried by said bracket and is designed, as best seen in Fig. 5, to have its opposite ends contact with contact-blocks 27 27, connected with binding-posts 28 28, contact with said blocks being made only when the plate 23 is lowered, the contact 26 being normally out of contact with said parts. A cable 29 is connected to the end of the slide 4, to which the spring 12 is connected, and said cable is preferably passed about a pulley 30 downwardly beneath the support 31 for the scale 21 about a pulley 32 forwardly and about a pulley 33 and down to a treadle or other operating device 34, whereby said cable may be readily pulled downwardly for moving the slide 4 against the action of the spring 12.

The foregoing, together with the circuit hereinafter traced, may constitute the complete apparatus, if desired; but I find in practice that when different receiving-containers are placed upon the plate 23 slightly different quantities of material are discharged owing to the differences in the quantity of material in transit between the valve and the receptacle on the plate 23. I propose to remedy this defect by ascertaining the weight of the material in transit between the valve and the lower end of the sleeve 6 and providing for having the same amount in transit at each operation. By allowing for such weight I am enabled to discharge the desired weight of material through the employment of a preferably cylindrical funnel 44, pivotally supported by laterally-projecting trunnions 45 45, journaled in plates 46 46. A strap 47 is preferably detachably secured to the plate 43 by any suitable attaching means, as screws 48, and said strap extends beyond the plate 43 and is turned upwardly and formed into upwardly-projecting arms 49 49, each of said arms being slotted longitudinally, as at 50. A set-screw 51 projects through the slot 50 of each arm 49 and through a similar slot 52 of the corresponding plate 46, where each plate 46 is adapted to be adjustably secured to the respective arm 49. The arms 49 and plates 46 are preferably of spring material and may be sprung apart slightly for permitting removal of the trunnions 45, so that various sizes of scoops 44 may be introduced, and the adjustment formed by the slots 50 52 facilitates the use of various sizes of scoops. In practice the funnel 44 is swung upon its pivots to a position with its lower end disposed out of the plane of the plate 23 and a bag or other container is slipped over such lower end of the funnel 44 and then permitted to swing back to the position above the plate 23. When the parts have assumed this position, the same are ready for the operation hereinafter described.

In operation, assuming the hopper or other container 1 to be supplied with the material to be weighed and the bag or other container to be positioned on the funnel 44, the required weight-block is positioned upon the plate 22 and the operator places his foot upon the treadle 34, which causes the slide to move from the closed position to the position in Fig. 1, which movement of the slide moves the notch 20 into position for being engaged by the depending arm of lever 18 and causes the opening 5 to register with the spout 2. The material being discharged through the spout 2 continues its discharge until a sufficient amount has entered the receptacle to overbalance the weight of the plate 22, which causes the plate 23 to descend, and thereby close the circuit between the two contact-blocks 27, the circuit between the contact-blocks 9 having been closed by the movement of the slide 4, actuated by the movement of the treadle 34. As soon as the circuit is closed between the contact-blocks 27 current passing from battery 35 or any other suitable source of electric energy flows through wire 36 to binding-posts 10, block 9, contact 8, second block 9, second binding-post 10, wire 37, the coil of the solenoid 15, wire 38, binding-post 39, plate 40, binding-post 41, wire 42, first binding-post 28, first contact-block 27, switch 26, second contact-block 27, second binding-post 28, and wire 43 to the opposite pole of the battery 35. Immediately upon the circuit being closed the thus energized solenoid lifts its core 16 and swings the horizontal arm of the lever 17 upwardly to a position for causing the vertical arm of said lever to lift out of the notch 20, which leaves the slide free to be thrown back by the spring 12 to a closed condition. Upon the slide 12 moving back to such position the contact established by contact 8 is broken, and therefore the core 16 is released and the lever 17 thus subjected to the weight of said core and prepared for entering the notch 20 upon the next operation of the treadle 34. As soon as the weight is removed from the plate 23 the contact 26 breaks contact, and thus leaves the circuit open even after the second operation of the treadle 34 closes contact of contact 8, the circuit being left open until the weight of the material being discharged causes the switch 26 to drop to a closed condition.

As indicated in Figs. 2 and 7, the container 1 is preferably provided with a divide 53, arranged transversely therein for supporting the bulk of the material within the container, the said divide being made up of inclined plates cut away at their corners for forming discharge-opening 54, through which the material in the container may pass in operation. The divide 53 is secured to the sides of the container 1 in any preferred manner.

The present improved weighing apparatus is of course especially well adapted for measuring out quantities of liquid as well as dry materials, especially such materials as feed readily—as, for instance, cereals, sugar, and the like. Of course I do not propose to limit the invention to any particular class of material, as the same may be found useful in the handling of a large variety of different substances.

What I claim is—

1. In a weighing apparatus, the combination with a hopper, a scale for weighing material discharged therefrom, of spaced contact-blocks carried by the hopper, a sliding valve governing the discharge from said hopper, a spring normally maintaining said valve in a closed position, spring-contacts carried by said sliding valve, means for locking said sliding valve in an open position against the action of the spring, electromagnetic means for releasing said sliding valve, and a circuit for said electromagnetic means including curved spring-contact fingers carried by the slide and in position to bridge the interval between the contact-blocks only when the slide is completely opened.

2. In a weighing apparatus, the combination with a hopper, a scale for weighing material discharged therefrom, of spaced contact-blocks carried by the hopper, a slide-valve arranged for normally cutting off the discharge from said hopper and formed with an aperture arranged at times to register with the discharge-opening of the hopper, a spring normally holding said valve in a closed position with the aperture thereof out of register with the hopper discharge-aperture, electrically-controlled means for retaining said slide in an open position with the aperture in register with the hopper discharge-aperture, a circuit for said electrically-controlled means including spring-contact fingers carried by the slide and positioned to bridge the interval between the contact-blocks only when the slide is at its completely-opened position.

3. In a weighing apparatus, the combination with a hopper, and a scale for weighing the material discharged therefrom, of a valve governing the discharge from said hopper and provided with a notch formed in its longitudinal edge, a lever arranged to engage within the notch and lock the said valve against movement, an electromagnet for swinging said lever out of locking engagement with the valve, and means carried by the valve for making and breaking the electric magnetic circuit.

4. In a weighing apparatus, the combination with a container, and a scale for weighing the material discharged from said container, of a slide-valve governing the discharge from said container, said valve being formed with an aperture, a spring normally retaining said valve in a closed condition, means for moving said valve against the pressure of said spring to an open position, means for locking said valve in an open position, electromagnetic means for releasing said locking means, an electric circuit for said releasing means, and means carried by said scale for making the electric circuit only when the slide is open.

5. In a weighing apparatus, the combination with means for supplying material to be weighed, and means for automatically cutting off such supply, of a pivotally-mounted funnel designed to direct the material supplied to the container arranged for receiving the same, and adjustable supports for the pivots of said funnel.

6. In a weighing apparatus, the combination with means for supplying the material to be weighed, and means for cutting off the supply of such material, of means for directing the material supplied to the point of disposition, plates pivotally supporting said directing means, and means adjustably supporting said plates.

7. In a weighing apparatus, the combination with a scale, and means for supplying material thereto, of means for cutting off the supply of said material, a pivotally-mounted funnel for directing the material from said supply means to said scale, arms carried by said scale, and plates supporting the pivots of said funnel and adjustably engaging said arms.

8. In a weighing apparatus, a material-container, a beam-scale below the container, a spring-actuated valve arranged to control the flow of material from the container to the scale and provided with a notch, a bell-crank lever arranged to engage one arm in the notch and lock the valve in an opened position, electromagnetic means arranged to unlock the valve, an electric circuit for energizing the electro means broken at two points, means carried by the valve to close one break when the valve is open, and means carried by the scale to close the other break when the beam is tilted by the weight of the material.

9. In a weighing apparatus, a material-container, a beam-scale below the container, a spring-actuated valve arranged to control the flow of material from the container to the scale, and provided with a notch, a lever arranged to engage the notch to lock the valve in an open position, a solenoid, a core associated with said solenoid and attached to the lever and arranged to unlock the valve, a solenoid-energizing circuit broken at two points, a contact-spring carried by the valve to close one break when the valve is open, and a contact-spring carried by the scale to close the other break when the beam is tilted by the weight of the material.

In testimony whereof I affix my signature in presence of two witnesses.

EDWIN A. CARMICHAEL.

Witnesses:
  H. G. HOEL,
  F. J. HOEL.